United States Patent
Kling

(10) Patent No.: US 7,917,576 B1
(45) Date of Patent: Mar. 29, 2011

(54) SYSTEM AND METHOD FOR SENDING ELECTRONIC MAIL IN A CLIENT-SERVER ARCHITECTURE

(75) Inventor: Brian D. Kling, Branchburg, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1269 days.

(21) Appl. No.: 09/735,891

(22) Filed: Dec. 14, 2000

(51) Int. Cl.
*G06F 15/16* (2006.01)

(52) U.S. Cl. ......................... 709/203; 709/206

(58) Field of Classification Search .................. 713/163; 709/203, 206, 218, 328
See application file for complete search history.

(56) References Cited

U.S. PATENT DOCUMENTS

| | | | |
|---|---|---|---|
| 5,557,798 A | 9/1996 | Skeen et al. | |
| 5,632,018 A * | 5/1997 | Otorii | 709/200 |
| 6,003,070 A * | 12/1999 | Frantz | 709/206 |
| 6,014,711 A * | 1/2000 | Brown | 709/245 |
| 6,085,101 A * | 7/2000 | Jain et al. | 455/500 |
| 6,178,331 B1 * | 1/2001 | Holmes et al. | 455/466 |
| 6,301,484 B1 * | 10/2001 | Rogers et al. | 455/466 |
| 6,330,238 B1 * | 12/2001 | Ooe | 370/390 |
| 6,335,928 B1 * | 1/2002 | Herrmann et al. | 370/352 |
| 6,356,356 B1 * | 3/2002 | Miller et al. | 358/1.15 |
| 6,400,722 B1 * | 6/2002 | Chuah et al. | 370/401 |
| 6,421,706 B1 * | 7/2002 | McNeill et al. | 709/204 |
| 6,442,250 B1 * | 8/2002 | Troen-Krasnow et al. | 379/93.15 |
| 6,445,682 B1 * | 9/2002 | Weitz | 370/257 |
| 6,456,601 B1 * | 9/2002 | Kozdon et al. | 370/259 |
| 6,470,385 B1 * | 10/2002 | Nakashima et al. | 709/224 |
| 6,513,019 B2 * | 1/2003 | Lewis | 705/35 |
| 6,556,835 B1 * | 4/2003 | Raivisto | 455/466 |
| 6,625,646 B1 * | 9/2003 | Kamanaka et al. | 709/224 |
| 6,636,888 B1 * | 10/2003 | Bookspan et al. | 709/203 |
| 6,665,667 B2 * | 12/2003 | Inaba et al. | 1/1 |
| 6,856,432 B2 * | 2/2005 | Bobrow et al. | 358/402 |
| 7,035,281 B1 * | 4/2006 | Spearman et al. | 370/465 |
| 7,035,383 B2 * | 4/2006 | O'Neal | 379/88.13 |
| 2002/0059405 A1 * | 5/2002 | Angwin et al. | 709/223 |
| 2006/0171514 A1 * | 8/2006 | O'Neal | 379/88.13 |

OTHER PUBLICATIONS

Sullivan, Eamonn, "Distributed applications get the message", Sep. 24, 1997, available at http://www.zdnet.com/eweek/reviews/0922/22tib.html.

TIB®/Rendezvous™, available at http://www.rv.tibco.com.

* cited by examiner

*Primary Examiner* — Moustafa M Meky

(74) *Attorney, Agent, or Firm* — Thomas, Kayden, Horstemeyer & Risley, LLP

(57) ABSTRACT

A method and system for sending electronic mail from clients of a client-server architecture using broadcast/multicast messaging software. In a representative embodiment, the system includes a plurality of clients each containing broadcast/multicast messaging software, data processing software, and a client application program interface (API); a messaging server containing broadcast/multicast messaging software and an email API; and an email server containing email software. In a representative embodiment of the method, the data processing software composes an email and forwards the email to the client API, the client API instructs the broadcast/multicast messaging software to send a message containing the email to the messaging server, the broadcast/multicast messaging software broadcasts or multicasts the message, and the messaging server receives the message, reformats the message, and forwards the reformatted message to the email server, which then forwards the email to a destination address.

31 Claims, 3 Drawing Sheets

SYSTEM AND METHOD FOR SENDING ELECTRONIC MAIL IN A CLIENT-SERVER ARCHITECTURE

BACKGROUND

1. Field of the Invention

The present invention relates to client-server computer network architectures, and in particular, to using broadcast and multicast messaging systems to provide clients with electronic mail capabilities.

2. Background of the Invention

Large private computer networks typically consist of a combination of Local Area Networks (LANs) and Wide-Area Networks (WANs). A LAN is a communication network that serves users within a confined geographical area. The components of a LAN consist of servers, workstations, a network operating system, and a communications link. Servers are high-speed machines that hold programs and data shared by all network users. The workstations, or clients, are the users' personal computers, which perform stand-alone processing and access the network servers as required.

A WAN is a group of LANs that are linked to each other over high-speed long distance communications lines or satellites that convey data quickly over long distances. A WAN covers a wide geographic area, such as a state or country, and requires the network facilities of common carriers. A WAN forms the "backbone" of the internal private computer network.

To efficiently share and distribute data among computers, private networks use what is known as client-server technology. In a typical client-server system architecture, one computer acts as the "back end" or server, which performs complex tasks for the clients. Other, smaller computers or terminals act as the "front-end" or clients, which communicate with the user. In this client-server model, the client requests data from the server. A client is defined as a requester of services and a server is defined as the provider of services. A single machine can be both a client and a server depending on the software configuration.

FIG. 1 illustrates a standard client-server system architecture. Server 100 is in communication with clients 102, 104, and 106. In addition, clients 102, 104, and 106 are in communication with each other over a LAN.

To conserve network resources, many private networks use messaging software that supports broadcast or multicast transmissions between the server and the clients. A broadcast transmission delivers a message to all clients and servers within a network. A multicast transmission delivers a message to a specific subset of the clients and servers within a network. As used herein, "broadcast" means to transmit a message from a single network component (e.g., a client) to all network components (e.g., clients and servers) with which the single network component is in communication. Also, as used herein, "multicast" is a form of broadcast, in which a single network component transmits a message to a group of network components, but not necessarily all network components. An example of this type of messaging software is TIB Rendezvous™ by TIBCO™ of Palo Alto, Calif. Another example of suitable messaging software is Transaction Control Protocol/Internet Protocol (TCP/IP), in which datagrams can be used to broadcast or multicast messages. In addition to broadcast and multicast messaging, these types of messaging software also support the traditional point-to-point communications.

In the example of FIG. 1, messaging software runs on server 100. Correspondingly, client computers 102, 104, and 106 run a viewer of the messaging software of server 100. Using the messaging software, server 100 can broadcast a single communication to clients 102, 104, and 106, instead of completing multiple point-to-point communications to each individual client. In addition to a broadcast, server 100 could also multicast a single message to, for example, clients 102 and 104, but not to client 106.

In either broadcast or multicast transmissions, each client is configured to receive all communications and to discern which communications are intended for it, using what is referred to as "subject-based addressing technology." According to this technology, neither the servers nor the client communicate directly. Rather, the servers and clients communicate using subjects in messages. These subjects are strings of text.

In the example of FIG. 1, server 100 puts a subject on a message to indicate to which client or clients the message is intended. Server 100 then broadcasts the message. Clients 102, 104, and 106 receive the message and check for a particular subject. A client is configured to recognize subjects pertinent to its operation, e.g., if a client is responsible for monitoring and analyzing the rate at which data packets are traveling through network device A, the client would pull data from all messages having the subject "device A traffic rate." If a client does not recognize the subject, the client simply ignores the message.

In addition to servers, a client can also send a single message to multiple clients and servers. To do so, the full messaging software resides on the client, instead of just the viewer of the messaging software. (The clients and servers use the same underlying protocol, with the application layer determining whether a machine is client or server.) In this situation, a server would also be configured to recognize messages intended for it, using the subject-based addressing technology.

Overall, this broadcast and multicast messaging technology minimizes the computing and communication responsibilities of the server. Despite serving multiple clients, the server need only process data once and send a single message. In addition, this broadcast/multicast technique reduces network bandwidth consumption by limiting the number of transmissions.

This broadcast and multicast messaging technology also simplifies client-server configuration. Ordinarily, the client-server model requires that the server and client be configured to recognize the address of every server with which it will communicate. The broadcast and multicast messaging software enables the server and client to communicate with a group of network components without specifying a recipient.

Broadcast and multicast messaging within a client-server network architecture serves many useful purposes. For example, a server could monitor the performance of a digital wireless packet switching network and report various performance data to the client computers. A network engineer of the digital wireless network service provider would monitor one or more of the client computers and would be responsible for some aspect of the digital wireless network performance. The performance data could include information such as network capacity, regional traffic data, and alarms indicating network areas experiencing overload conditions. Thus, the server would periodically broadcast to all clients a message containing some aspect of network performance. Using the subject-based addressing technology, each client would capture messages containing data intended for the client, and would display the data through its compatible viewer or user interface. After viewing the network performance, a network engineer could then make operational adjustments to improve the performance of the digital wireless network.

In an application such as the one described above, the ability to remotely contact the network engineer is especially helpful. In this way, the network engineer does not have to constantly monitor his client computer for alerts. As an example, if a client computer detects corrupt data, the client computer could notify the network engineer to correct the problem before the system suffers a catastrophic error. Electronic mail to a pager is a logical vehicle for such a notification.

However, providing email capabilities to all client computers of a client-server architecture is a complicated exercise. A typical implementation of the client-server architecture and broadcast/multicast transmission scheme can involve very different types of client computers, all with different software. For example, some clients may be dual purpose, functioning also as servers or "back-office" machines, while others may simply be personal computer workstations providing user access. The clients may also be a part of different departments within a company, using different electronic mail software. For example, one client computer may be networked with computers in a managing department using Lotus Notes™, while another client may be networked with other computers in an information technology department using Microsoft Outlook™. Still other client computers may not have electronic mail capabilities at all. In addition to different company departments, sometimes the clients may not even be a part of the same company, increasing the possibility that the clients use different software.

Having differently configured software on the clients complicates the task of providing email capabilities to each of the clients. For example, in FIG. 1, if the network administrator wishes to give clients 102, 104, and 106 the ability to send email over network 110 through email server 108, then the administrator must configure each client with email software compatible with email server 108. Email server 108 could then forward email over network 110 (e.g., the Internet) to, for example, a wireless paging system that notifies the network engineer. However, if the administrator then decides to change the email configuration of email server 108, then all of the clients must be re-configured.

Alternatively, the network administrator could configure clients 102, 104, and 106 to send email directly through Internet 110 and not through email server 108. However, this configuration complicates network security procedures because the administrator must then monitor the security of each client 102, 104, and 106, instead of the single server 108. In addition, the network administrator must devote considerable time and money to providing individual Internet access and Internet browsing software to a number of individual clients.

SUMMARY OF THE INVENTION

The present invention is a system and method for providing electronic mail capabilities to clients of a client-server architecture, without requiring electronic mail software on the individual clients. The present invention provides the email capabilities using existing broadcast/multicast messaging software installed on the servers and clients. Thus, network administrators can conveniently configure clients to transmit information via email, while avoiding the complications associated with providing email access to individual clients, such as complications related to monitoring security at multiple clients, the time and cost required to provide Internet access and Internet browsing software, and the time required to configure the clients to be compatible with an email server.

In a representative embodiment of the present invention, the system includes a plurality of clients each containing broadcast/multicast messaging software, data processing software, and a client application program interface (API); a messaging server containing broadcast/multicast messaging software and an email API; and an email server containing email software.

In each client of the plurality of clients, the broadcast/multicast messaging software enables the client to communicate with the server and the other clients. The data processing software processes data received from another client or server of another system or systems, monitors for events requiring email notification, and composes email corresponding to those events. The client API of each client is embedded in the code of the data processing software. The client API receives the email composed by the data processing software and instructs the broadcast/multicast messaging software to send a message containing the email to the messaging server. As one skilled in the art would appreciate, the client API could take the form of a dynamic link library (DLL), a control (e.g., an ActiveX™ control), an object module, or any other suitable program package. As one skilled in the art would also appreciate, a client could be a server that is functioning as a client in relation to another server.

In the messaging server, the broadcast/multicast messaging software enables the server to communicate with the clients. The email API of the messaging server receives the message containing the email from the plurality of clients and reformats the message from a format compatible with the broadcast/multicast messaging software to a format compatible with the email server. As one skilled in the art would appreciate, the email API could take the form of a dynamic link library (DLL), a control (e.g., an ActiveX™ control), an object module, or any other suitable program package.

The email server receives the reformatted email from the email API of the messaging server and forwards the email through a network to the recipient specified by the address of the message.

Together, the above components provide clients in a client-server architecture with the ability to send email without requiring dedicated, installed email software. According to a representative embodiment of the present invention, the method for sending an email begins when the data processing software of a client identifies that a particular event requires an email notification. In response, the data processing software composes an email, which contains a destination email address, an email body, and an email subject corresponding to the particular event. The data processing software then forwards the email to the client API of the client.

The client API instructs the broadcast/multicast messaging software to send a message containing the email to the messaging server. In response, the broadcast/multicast messaging software broadcasts or multicasts to a group of clients and servers with which it is networked a message that contains the email body, subject, and address. As a member of this group, the messaging server receives the message, which is formatted according to the broadcast/multicast messaging software. In response, the email API of the messaging server reformats the message to a format compatible with the email server. Finally, the messaging server forwards the reformatted message to the email server, which then forwards the email through a network to the destination address.

Accordingly, an object of the present invention is to provide email capabilities to clients in a client-server architecture.

Another object of the present invention is to send email from clients operating within a client-server architecture, without requiring electronic mail software on the individual clients.

Another object of the present invention is to provide a system and method that automatically forwards an email to a network engineer in response to a particular event.

These and other objects of the present invention are described in greater detail in the detailed description of the invention, the appended drawings, and the attached claims.

DETAILED DESCRIPTION OF THE INVENTION

The present invention is a method and system for sending electronic mail messages from clients operating within a client-server architecture, without requiring electronic mail software on the individual clients.

Figure 1:
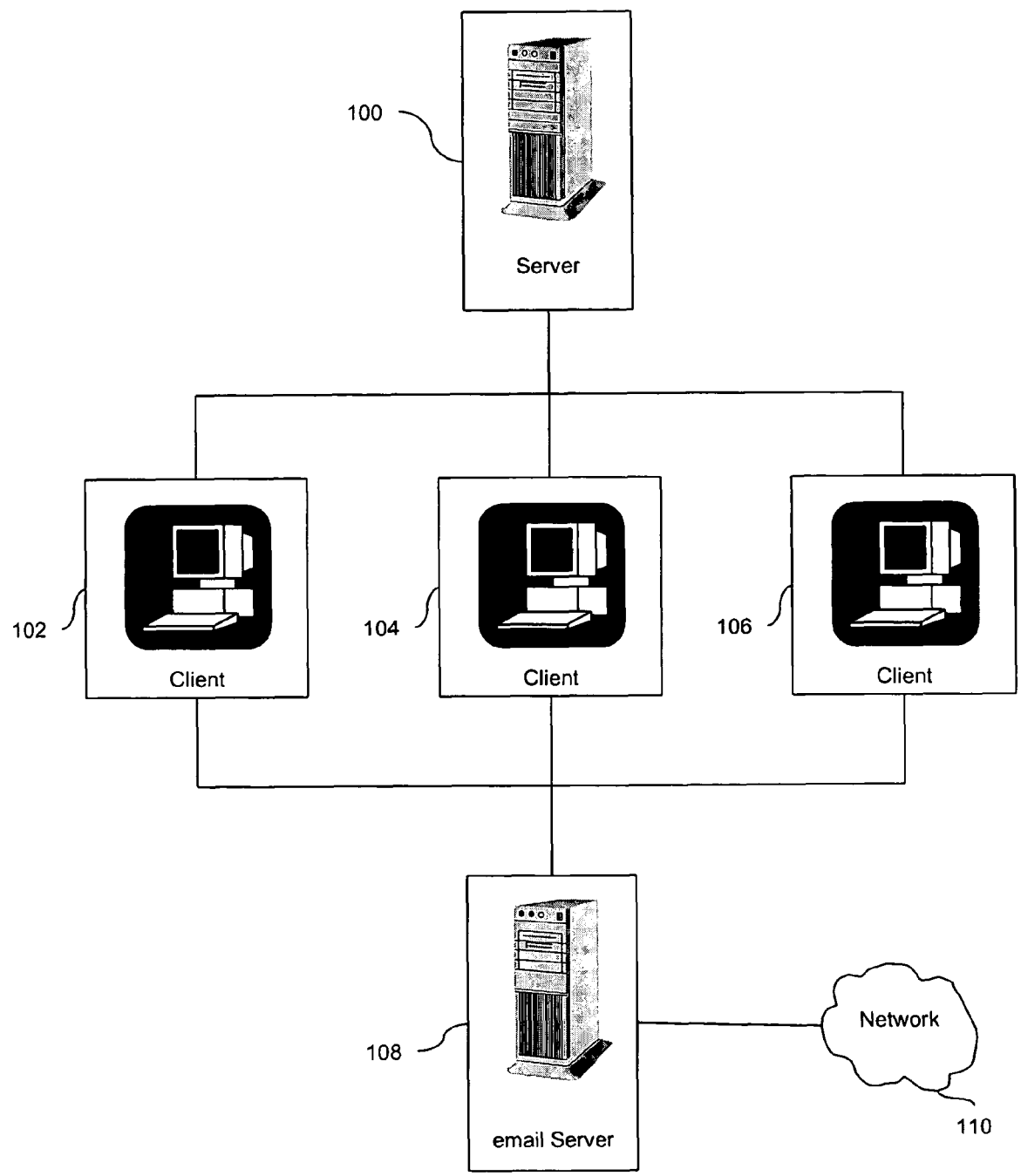
FIG. 1 is a schematic diagram of a prior art client-server system architecture.
Figure 2:
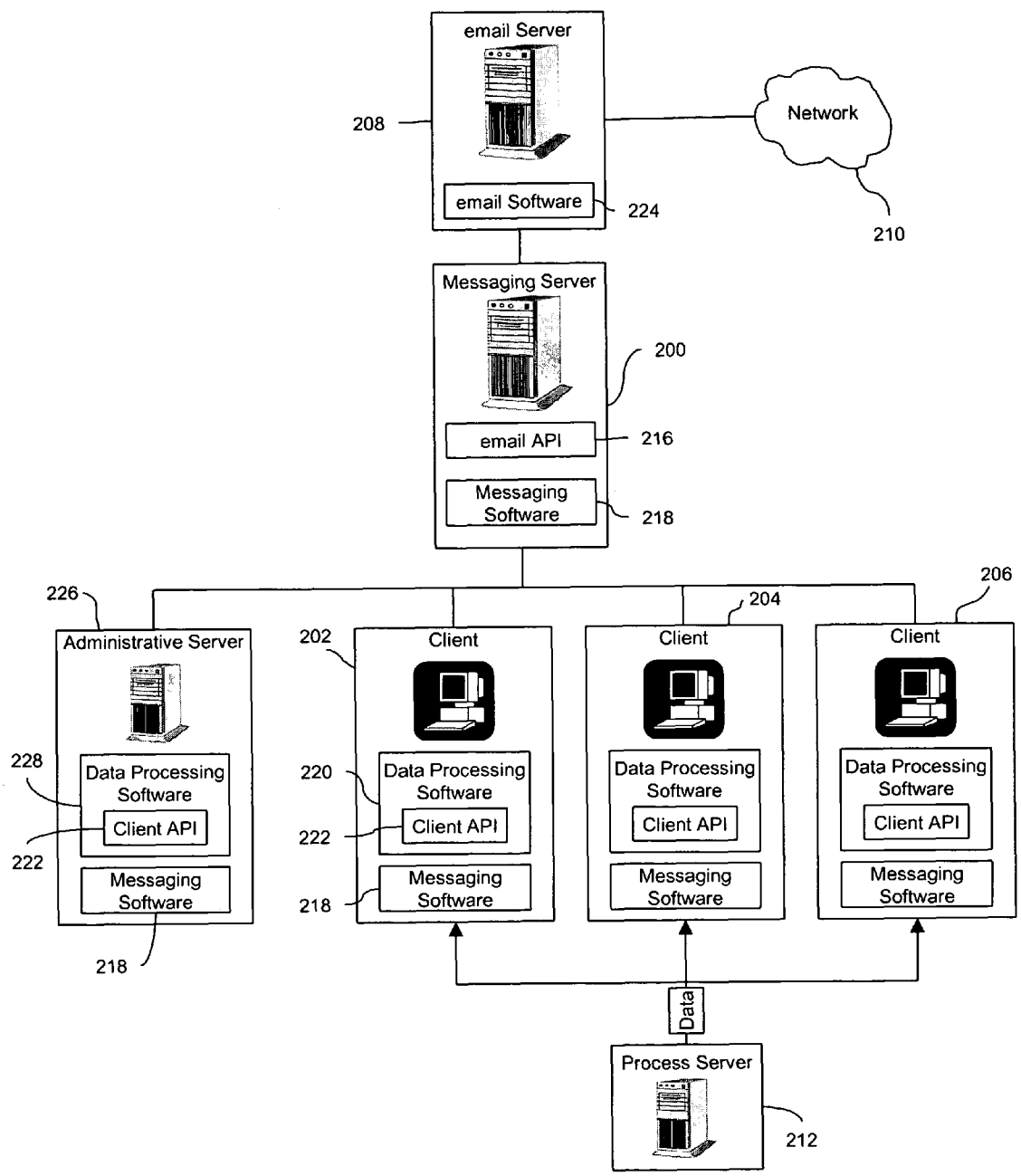
FIG. 2 is a schematic diagram of a system for sending email from clients operating within a client-server architecture, according to a representative embodiment of the present invention.

FIG. 2 illustrates a representative embodiment of the present invention. In the client-server architecture shown in FIG. 2, each of clients 202, 204, and 206 is in communication with messaging server 200 and the other clients using broadcast/multicast messaging software 218. Messaging software 218 provides clients 202, 204, and 206 with full broadcasting and multicasting capabilities. Although FIG. 2 shows distinct server and client tiers, as one of ordinary skill in the art would appreciate, a single machine could be both a client and a server depending on the software configuration.

Messaging server 200 is in communication with clients 202, 204, and 206 using broadcast/multicast messaging software 218. Using an email API 216, messaging server 200 is also in communication with an email server 208. In turn, email server 208 is in communication with a network 210 using email software 224. Network 210 is any suitable communications network that supports electronic mail. For example, network 210 is the Internet. Preferably, network 210 includes a digital wireless packet switched network in communication with the Internet, through which an email can be sent, for example, to a wireless pager.

FIG. 2 also shows additional servers 212 and 226 linked to clients 202, 204, and 206. Servers 212 and 226 execute additional complex tasks on behalf of the clients and are shown to exemplify circumstances that precipitate the sending of email by one of clients 202, 204, and 206 or server 226. Although FIG. 2 and the corresponding description that follows illustrate specific circumstances in which sending email from a client is desirable, it should be understood that the present invention is not limited to these specific circumstances. Indeed, the present invention applies to any situation in which a client operating within a client-server architecture must send email without having electronic mail software. Thus, the scope of the invention should be determined not by the specific circumstances of the exemplary embodiments, but by the appended claims and their equivalents.

As an example of a circumstance in which sending email from a client is desirable, process server 212 monitors a process and reports data from that monitoring to clients 202, 204, and 206. Specifically, process server 212 could monitor a digital wireless packet switching network and report network performance data such as available network capacity, regional traffic data, and overload alarms. Process server 212 preferably transmits the network performance data to clients 202, 204, and 206, using broadcast, multicast, or point-to-point messaging. With broadcast and multicast messaging, each of clients 202, 204, and 206 can use (but does not necessarily have to) subject-based addressing technology to capture only those messages intended for it. In addition to monitoring the digital wireless network, process server 212 could also concurrently perform several other complex tasks on behalf of clients 202, 204, and 206, and forward the data resulting from those tasks to clients 202, 204, and 206 as required.

After receiving data from process server 212, clients 202, 204, and 206 perform additional analyses using data processing software 220. For instance, if process server 212 is forwarding network capacity data to client 202, client 202 could trend the network capacity data to determine if a change in network traffic routing is required. If an urgent routing change is required, then data processing software 220 of client 202 would compose and initiate an email to a network engineer reporting the need. Client API 222, which is embedded in data processing software 220, receives the email composed by data processing software 220 and instructs messaging software 218 to send the email to messaging server 200.

As another example of a circumstance in which sending email from a client is desirable, administrative server 226 monitors available hard drive disk space on clients 202, 204, and 206. In this example, administrative server 226 serves dual purposes, acting as a server in relation to clients 202, 204, and 206, but also acting as a client in relation to messaging server 200. As clients 202, 204, and 206 receive, view, and analyze data from multiple servers, clients 202, 204, and 206 consume hard disk drive space. If the processing eventually consumes most or all available hard disk drive space, a client potentially will fail to execute its functions. Therefore, administrative server 226 continuously polls clients 202, 204, and 206 to monitor available disk space.

If administrative server 226 determines that a client is running out of disk space, then data processing software 228 of administrative server 226 composes and initiates an email, for example, reporting the shortage to a network engineer.

Client API 222, which is embedded in data processing software 228, receives the email composed by data processing software 228 and instructs messaging software 218 to send a message containing the email to messaging server 200. Thus, in this respect, administrative server 226 is functioning as a client of messaging server 200.

Figure 3:
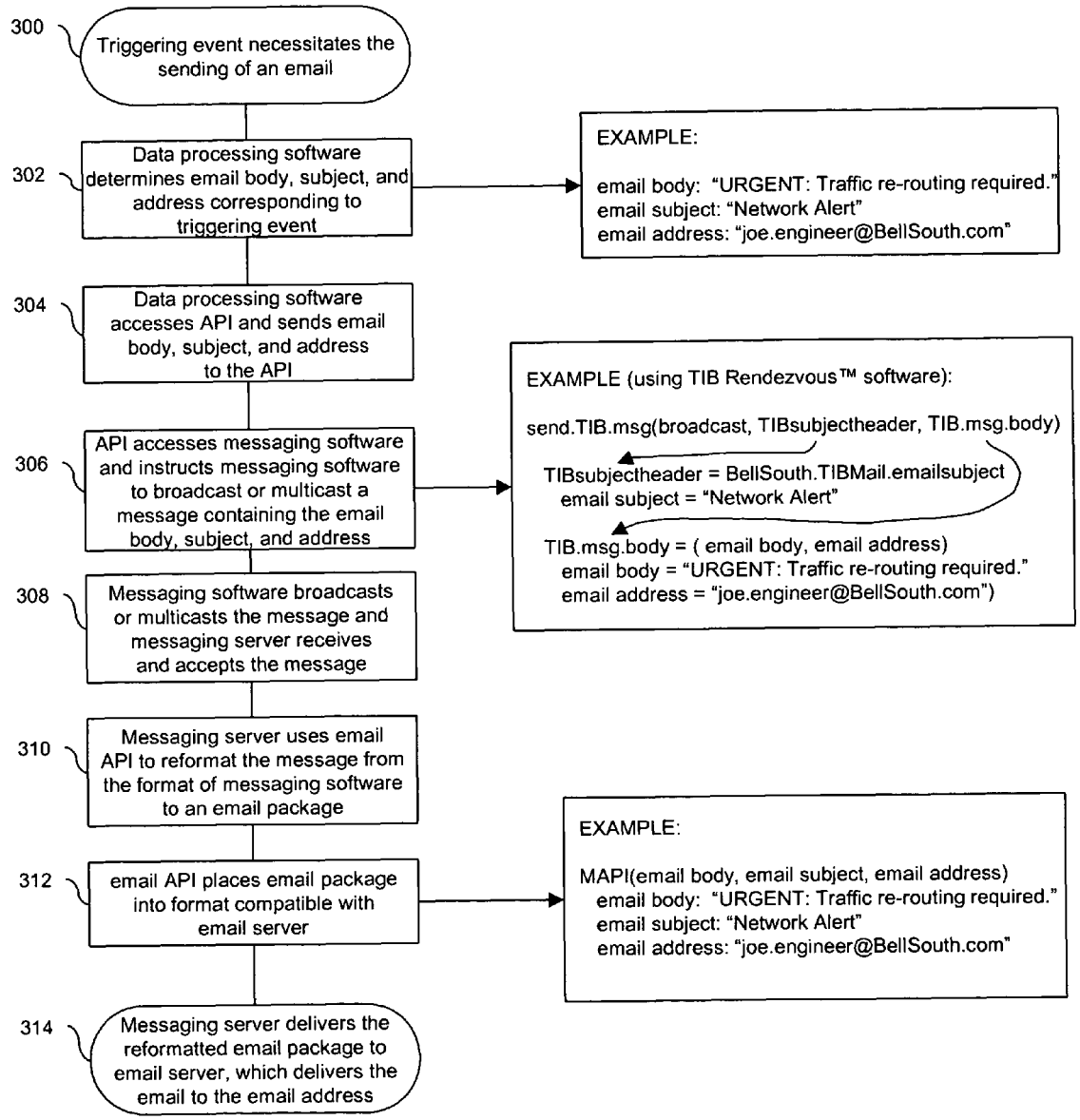
FIG. 3 is a flow chart describing a method for sending email from clients operating within a client-server architecture, according to a representative embodiment of the present invention.

FIG. 3 is a flow chart outlining a representative embodiment of the method of the present invention. While the system operation described herein and illustrated in the diagram and flowchart contains many specific details, these details should not be construed as limitations on the scope of the invention, but rather as examples of representative embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

In FIG. 3, the method commences in step 300 with the determination that an email is required. Although no specific reason for sending email is critical to the present invention, the triggering events discussed above relating to process server 212 and administrative server 226 illustrate example situations that could precipitate the need for a client to send an email. In the example of administrative server 206, administrative server 206 could monitor for the triggering event using the following programming, written in pseudo-code: "If (client disk space <20 MB) then send.message(email body, email subject, email address)."

In step 302, in accordance with the "send.message(email body, email subject, email address)" command, the data processing software of the client determines the email body, email subject, and email address that correspond to the triggering event. Preferably, the data processing software consults a database that cross-references this information with each type of triggering event. The email body describes, for example, the triggering event and any actions that must be taken. As with typical email, the email subject is a word or words summarizing the content of the email body. The email address is the destination address for the email, which corresponds to the person responsible for reacting to the triggering event. For example, the email address could be the email address of a network engineer's wireless pager.

Thus, for example, if client 202 receives data from process server 212 that suggests an urgent need for traffic re-routing, data processing software 220 would select the following pre-defined email body to be sent to the responsible network engineer: "URGENT: Traffic re-routing required." The corresponding email subject could be "Network Alert." The email address of the responsible network engineer could be "joe.engineer@BellSouth.com". FIG. 3 illustrates this example.

As another example, if administrative server 226 in FIG. 2 determines that client 206 is running out of disk space, data processing software 228 would select the following pre-defined email body to be sent to the responsible network engineer: "URGENT: Client 206 has less than 20 MB of free disk space." The corresponding email subject could be "Disk Space Alert."

In step 304, the data processing software accesses its embedded API and sends the email body, email subject, and email address of the email to the API. Thus, for clients 202, 204, and 206, data processing software 220 accesses client API 222. For administrative server 226, which in this situation is functioning as a client, data processing software 228 accesses client API 222.

In step 306, the client API accesses the messaging software and instructs the messaging software to broadcast or multicast a message (including the email body, subject, and address) to messaging server 200. Thus, in the case of a client, client API 222 instructs messaging software 218 to transmit a message for receipt by messaging server 200. Likewise, in the case of administrative server 226, which is functioning as a client, client API 222 instructs messaging software 218 to transmit a message for receipt by messaging server 200.

The following pseudo-code is an example of client API 222 written in TIB Rendezvous™ format:

:\ Access TIB Rendezvous Software
:\ send.TIB.msg(broadcast, TIBsubjectheader, TIB.msg.body) FIG. 3 provides an example of the "send.TIB.msg" command, which corresponds to the example provided for step 302 in FIG. 3. In the command, "broadcast" indicates how the TIB Rendezvous™ software should deliver the message. In addition to broadcast, this parameter could be "multicast." (The delivery could also be point-to-point; however, this method would require an additional configuration for each client and would eliminate the benefits that broadcasting and multicasting provide.)

The "TIBsubjectheader" parameter is a text string composed of multiple fields in a dot notation, which provides the subject-based addressing feature of TIB Rendezvous™. An example of the text string is as follows: "BellSouth.TIB-Mail.emailsubject". The "BellSouth" field identifies the client-server network through which the message is broadcast or multicast. The "TIBMail" field indicates to which recipient the message is intended. In other words, the "TIBMail" field is the subject for the subject-based addressing of the broadcast or multicast messaging (which is not to be confused with the email subject forwarded by the data processing software to the client API in step 304). In this representative embodiment, messaging server 200 is configured to recognize the "TIBMail" field of the "TIBsubjectheader" parameter so that messaging server 200 reads the broadcast/multicast message sent by clients 202, 204, or 206 or administrative server 226. Finally, the "emailsubject" field of the "TIBsubjectheader" parameter corresponds to the email subject forwarded by the data processing software to the client API in step 304, which in the two examples above is "Network Alert" and "Disk Space Alert," respectively.

The "TIB.msg.body" parameter includes the email body and email address(es) forwarded by the data processing software to the client API in step 304.

In response to the instructions from the client API, messaging software 218 broadcasts or multicasts the message in step 308. In the case of a client initiating the message, administrative server 226, process server 212, and the remaining clients receive the broadcast message. However, because of the subject-based addressing (e.g., showing "TIBMail" in the TIBsubjectheader field), only messaging server 200 accepts the message (through its messaging software 218). Process server 212 and the remaining clients simply ignore the message. In the case of administrative server 226 initiating the message, clients 202, 204, and 206 and messaging server 200 receive the broadcast message. However, again, because of the subject-based addressing, only messaging server 200 accepts the message.

In step 310, after accepting the message, messaging server 200 uses email API 216 to reformat the message from the format of messaging software 218 to an email package. Thus, for example, if messaging software 218 is TIB Rendezvous™, then email API 216 reformats the message from a TIB Rendezvous package to an email package.

In step 312, email API 216 places the email package into a format that is compatible with email server 208. An example of a suitable format is Messaging Application Program Interface (MAPI), which is an ActiveX™ control provided by Microsoft Corporation™.

The following pseudo-code is an example of the function calls that accomplish the translation of step 312:

:\ MAPI(email body, email subject, email address)
:\ send.mail

The first function call sets up the message and the second function call sends the message out. The "email body", "email subject," and "email address" parameters correspond to the email address, email subject, and email body forwarded by the data processing software to the client API in step 304. FIG. 3 provides an example of the MAPI function call, which corresponds to the examples provided for steps 302 and 306.

In step 314, messaging server 200 forwards the reformatted email package to email server 208, which then delivers the email through network 210 to the destination address using email software 224. For example, email server 208 could be a MS Exchange™ server and email software 224 could be Transaction Control Protocol/Internet Protocol (TCP/IP), Netware™, or any other network protocol suitable for transmitting the email.

According to the representative embodiments described above, messaging server 200 uses messaging software 218 to receive a broadcast or multicast message containing an email from a client. Messaging server 218 also uses email API 216 to reformat the message from the messaging software format to a format required by email server 208. However, as one skilled in the art would appreciate, the messaging server could use a single TCP/IP program to accomplish the functions of messaging software 218 and email API 216. In replacing messaging software 218 and email API 216, however, the TCP/IP program would likely involve extensive coding. Thus, using the commercially available messaging software and the email API is preferable.

In the representative embodiments described above, data processing software 220 and 228 function automatically, receiving and analyzing data, monitoring for triggering events, and composing the body, subject, and address of email based on the triggering events. However, as an alternative, data processing software 220 or 228 could be a test or debugging program of messaging software 218 through which a user could manually enter the body, subject, and address of an email. The test program of messaging software 218 accesses client API 222 and operates similarly to the terminal feature of Microsoft Windows™. For example, in TIB Rendezvous™, the RV JLS Demo Program could provide this functionality. A user would manually enter the body, subject, and address of the email and send that information to client API 222, at which point the process would continue as described above. In this case, the user would himself determine the triggering event for sending an email from a client.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for sending electronic mail from a client operating within a client-server architecture, the method comprising:
   (a) provisioning the client with client broadcast text messaging software;
   (b) provisioning a server with server broadcast text messaging software,
      wherein the server is in communication with the client;
   (c) broadcasting from the client a text message in a broadcast transmission in a format of the broadcast text messaging software using subject based addressing wherein text in a subject field of the text message indicates an intended recipient, and wherein the text message is a non-email formatted message and contains electronic mail parameters including a destination email address for the electronic mail in a body of the text message;
   (d) receiving the text message at the server after discerning from the text in the subject field that the text message is intended for the server;
   (e) reformatting the text message from the format of the broadcast text messaging software to a format compatible with an email server, wherein the reformatted text message is addressed to the destination email address obtained from the body of the text message; and
   (f) forwarding the reformatted text message to the email server in an email transmission to the destination email address;
      wherein broadcasting includes transmitting a text message from a single network component to all components on a network;
      wherein broadcasting the text message containing the electronic mail parameters comprises:
   (i) identifying a triggering event that precipitates a need for the electronic mail;
   (ii) determining an email body, an email subject, and the destination email address for the electronic mail, wherein the email body, the email subject, and the destination email address correspond to the triggering event; and
   (iii) instructing the client broadcast text messaging software to broadcast the text message containing the electronic mail parameters, wherein the electronic mail parameters contains the email body, the email subject, and the destination email address.

2. The method of claim 1, wherein the client monitors data traffic in a digital wireless packet switching network and the triggering event is an overload on network capacity that requires a change in traffic routing.

3. The method of claim 1, wherein the client monitors hard disk space on other clients, and the triggering event is a shortage of hard disk space.

4. The method of claim 1, wherein determining the email body, the email subject, and the destination email address comprises consulting a database cross-referencing triggering events with email bodies, email subjects, and email addresses.

5. The method of claim 1, wherein determining the email body, the email subject, and the destination email address comprises a user manually entering the email body, the email subject, and the destination email address into a test program of the client broadcast text messaging software.

6. The method of claim 1, further comprising forwarding the electronic mail from the email server through a network to the destination email address.

7. The method of claim 1, wherein broadcasting the text message containing the electronic mail parameters comprises:
   (i) determining an email body, an email subject, and a destination email address using data processing software;
   (ii) accessing an application program interface of the data processing software;

(iii) sending the email body, the email subject, and the destination email address to the application program interface; and (iv) accessing the client broadcast text messaging software with the application program interface and instructing the client broadcast text messaging software to broadcast the text message, wherein the text message contains the email body, the email subject, and the destination email address.

8. The method of claim 1, further comprising forwarding the electronic mail from the email server through the network to the destination email address.

9. The method of claim 8, wherein the destination email address is an email address of a wireless pager.

10. The method claim 1, wherein the server is configured to capture the text message based on recognition of the subject and read the text message.

11. The method of claim 1, wherein the format compatible with the email server is Messaging Application Program Interface (MAPI).

12. The method of claim 1, wherein the client broadcast text messaging software is different from, but compatible with, the server broadcast text messaging software.

13. The method of claim 1, wherein the client broadcast text messaging software and the server broadcast text messaging software are TIB Rendezvous™.

14. A system for sending an electronic mail (email) from a client in a client-server architecture, the system comprising:
(a) a plurality of clients, wherein each client of the plurality of clients contains client broadcast text messaging software, data processing software, and a client application program interface, and wherein each client is in communication with the plurality of clients;
(b) a text messaging server in communication with the plurality of clients, wherein the text messaging server contains server broadcast text messaging software and an email application program interface, wherein the email application program interface is adapted to receive a text message containing parameters of the electronic mail using subject based addressing in a broadcast transmission wherein the text message is a non-email formatted message and text in a subject field of the text message indicates an intended recipient and a destination email address is contained in a body of the text message, wherein the text messaging server discerns from the text in the subject field that the text message is intended for the text messaging server, and reformats the text message from a format compatible with the server broadcast text messaging software to a format compatible with an email server and addressed to the destination email address; and
(c) an email server in communication with the text messaging server;
wherein the broadcast text messaging software is configured to transmit a text message from a single network component to all components on a network;
wherein broadcasting the text message containing the electronic mail parameters comprises:
(i) identifying a triggering event that precipitates a need for the electronic mail;
(ii) determining an email body, an email subject, and the destination email address for the electronic mail, wherein the email body, the email subject, and the destination email address correspond to the triggering event; and
(iii) instructing the client broadcast text messaging software to broadcast the text message containing the electronic mail parameters, wherein the electronic mail parameters contains the email body, the email subject, and the destination email address.

15. The system of claim 14, wherein the data processing software is a testing program of the client text messaging software through which a user can enter an email body, an email subject, and a destination email address for the electronic mail.

16. The system of claim 14, wherein the client application program interface is adapted to instruct the client broadcast text messaging software to send a text message containing the electronic mail to the text messaging server.

17. The system of claim 14, wherein the client application program interface is one of a dynamic link library, a control, and an object module.

18. The system of claim 14, wherein the email application program interface is one of a dynamic link library, a control, and an object module.

19. The system of claim 14, wherein the client broadcast text messaging software enables broadcasts and multicasts from the plurality of clients.

20. The system of claim 14, wherein the client broadcast text messaging software is different from, but compatible with, the server broadcast text messaging software.

21. The system of claim 14, wherein the client broadcast text messaging software is the same as the server broadcast text messaging software.

22. The system of claim 14, wherein the client broadcast text messaging software and the server broadcast text messaging server are TIB Rendezvous.

23. The system of claim 14, wherein the email server is adapted to receive the electronic mail and forward the electronic mail through a network.

24. The system of claim 14, wherein the server broadcast text messaging software and the email application program interface are a single Transaction Control Protocol/Internet Protocol program.

25. A method for sending an electronic mail (email) comprising:
(a) broadcasting from a client computer a text message in a broadcast format using subject based addressing wherein the text message is a non-email formatted message text in a subject field of the text message indicates an intended recipient, and a body of the text message contains a destination email address, email subject, and email body for the electronic email, wherein the client computer is part of a client-server architecture;
(b) receiving the text message at a server computer of the client-server architecture after discerning from the text in the subject field that the text message is intended for the server computer;
(c) reformatting the text message from the broadcast format to an email format having the destination email address, the email subject, and the email body from the text message; and
(d) forwarding the reformatted text message to an email server that is compatible with the email format;
wherein broadcasting includes transmitting a text message from a single component on a network;
wherein broadcasting the text message comprises:
(i) identifying a triggering event that precipitates a need for the electronic mail;
(ii) determining an email body, an email subject, and the destination email address for the electronic mail, wherein the email body, the email subject, and the destination email address correspond to the triggering event; and (iii) instructing the client broadcast text messaging software to broadcast the text message containing the electronic mail parameters, wherein the electronic mail parameters contains the email body, the email subject, and the destination email address.

26. The method of claim 25, wherein the client computer uses TIB Rendezvous™ software to broadcast the text message containing the electronic mail, and wherein the server computer uses TIB Rendezvous™ software to receive the message.

27. The method of claim 25, wherein the client computer uses Transaction Control Protocol/Internet Protocol software to broadcast the text message containing the electronic mail, and wherein the server computer uses Transaction Control Protocol/Internet Protocol software to receive the text message.

28. The method of claim 25, further comprising forwarding the electronic mail from the email server through a network to the destination email address specified in the electronic mail.

29. The method of claim 25, wherein the broadcast format is a TIB Rendezvous™ format and the email format is a Messaging Application Program Interface (MAPI) format.

30. A system for sending an electronic mail from a client in a client-server architecture, the system comprising:
   (a) means for broadcasting from a client computer a text message in a broadcast format using subject based addressing wherein the text message is a non email formatted message text in a subject field of the text message indicates an intended recipient, and a body of the text message contains a destination email address, email subject, and email body for the electronic email, wherein the client computer is part of a client-server architecture;
   (b) means for receiving the text message at a server computer of the client server architecture after discerning from the text in the subject field that the text message is intended for the server computer;
   (c) means for reformatting the text message from the broadcast format to an email format having the destination email address, the email subject, and the email body from the text message; and
   (d) means for forwarding the reformatted text message to an email server that is compatible with the email format;
      wherein broadcasting includes transmitting a text message from a single network component to all components on a network;
      wherein broadcasting the text message comprises:
   (i) identifying a triggering event that precipitates a need for the electronic mail;
   (ii) determining an email body, an email subject, and the destination email address for the electronic mail, wherein the email body, the email subject, and the destination email address correspond to the triggering event; and
   (iii) instructing the client broadcast text messaging software to broadcast the text message containing the electronic mail parameters, wherein the electronic mail parameters contains the email body, the email subject, and the destination email address.

31. The system of claim 30, wherein the broadcast format is a TIB Rendezvous™ format and the email format is a Messaging Application Program Interface (MAPI) format.

* * * * *